United States Patent [19]

Stammer et al.

[11] Patent Number: 4,847,555

[45] Date of Patent: Jul. 11, 1989

[54] DEVICE FOR DETECTING ROTATIONAL SPEED OF A MOTOR USING FIRST AND SECOND SENSORS AND A SWITCHING UNIT TO SELECT BETWEEN THE TWO SENSORS

[75] Inventors: Walter Stammer, Dielheim; Bertold Grützmacher, Schriesheim; Peter T. Blaser, Dielheim, all of Fed. Rep. of Germany

[73] Assignee: Heidelberger Druckmaschinen AG, Heidelberg, Fed. Rep. of Germany

[21] Appl. No.: 129,055

[22] Filed: Dec. 7, 1987

[30] Foreign Application Priority Data

Dec. 5, 1986 [DE] Fed. Rep. of Germany ....... 3641538

[51] Int. Cl.$^4$ .......................... H02P 5/00; G01P 3/36; G01P 3/56
[52] U.S. Cl. .................................. 324/161; 324/166; 324/173; 324/175; 318/254; 388/933
[58] Field of Search ............... 324/160, 161, 164, 166, 324/173, 174, 175, 208; 318/313, 318; 250/231 SE

[56] References Cited

U.S. PATENT DOCUMENTS

| | | | |
|---|---|---|---|
| 3,573,619 | 4/1971 | Yoliet, III | 324/174 |
| 4,216,419 | 8/1980 | van Dam et al. | 318/318 X |
| 4,228,396 | 10/1980 | Palombo et al. | 324/175 X |
| 4,229,695 | 10/1980 | Bassi | 324/166 |
| 4,246,536 | 1/1981 | Bradley et al. | 324/177 |
| 4,560,927 | 12/1985 | Ishida et al. | 324/161 X |

FOREIGN PATENT DOCUMENTS 0095363  5/1985  Japan .................. 324/175

Primary Examiner—Reinhard J. Eisenzopf
Assistant Examiner—Jack B. Harvey
Attorney, Agent, or Firm—Herbert L. Lerner; Laurence A. Greenberg

[57] ABSTRACT

A device for detecting the rotational speed of a motor by a first rotational speed sensor and at least a second rotational speed sensor and a switch unit connected to the rotational speed sensors, the switch unit selecting signals from one of the sensors within a respective given rotational speed range.

6 Claims, 5 Drawing Sheets

DEVICE FOR DETECTING ROTATIONAL SPEED OF A MOTOR USING FIRST AND SECOND SENSORS AND A SWITCHING UNIT TO SELECT BETWEEN THE TWO SENSORS

SPECIFICATION

The invention relates to a device for detecting rotational speed of a motor and, more particularly, of a brushless direct-current motor by means of a rotational speed sensor.

It has become known heretofore to connect a rotational speed sensor with a motor shaft for the purpose of detecting the rotational or rotary speed thereof, for example, in order to control the speed. For this purpose, conventional tacho-generator systems, such as direct-current tachometers or digital tachometers which work with a grating diaphragm in a transillumination or transmitted light operation, are employed. If the rotational speed of the motor is to be detected with great accuracy from zero to a maximum value, very complex and expensive sensors are required due to the wide speed range. Moreover, these sensors require a relatively large space, i.e. the motor becomes elongated, and connecting the sensor with the motor shaft requires special coupling elements.

It is accordingly an object of the invention to provide a device for detecting rotational speed which is effective over the entire speed range of the motor.

With the foregoing and other objects in view, there is provided, in accordance with the invention, a device for detecting the rotational speed of a motor by means of a rotational speed sensor, comprising at least another rotational speed sensor and a switch unit connected to the other rotational speed sensor, the switch unit selecting signals of the other sensor within a respective given rotational speed range.

The fact that relatively simple sensors operating only within a narrow speed range can be employed is an advantage of the invention. For example, a high-resolution reflex light barrier can be used for the low speed range of the motor. Because the signal frequency of the reflex light barrier is limited, however, the switch unit performs a switch-over to the other or second sensor after a given rotational speed is reached, i.e. starting from this instant of time, the signal of the other or second sensor is used to determine the rotational speed of the motor.

In accordance with another feature of the invention, the first-mentioned rotational speed sensor is an incremental generator having a relatively high resolution, and the other rotational speed sensor is an incremental generator having a relatively low resolution. In this case, the switch unit switches from one incremental generator to the other, the instant a boundary value between both speed ranges has been reached. Of course, it is possible to establish several speed ranges to each of which a respective sensor is assigned. However, it has been found to be appropriate and sufficient to employ two rotational speed sensors, even in the case of high-speed drives.

In the case of a brushless DC motor having an electronic commutation, it is possible to use commutation signals of position indicators for determining the rotational speed in an upper range, i.e. in the case of higher speed values. In this regard, it is possible to determine only the signal of a single position indicator or to form the rotational speed signal from a combination of the signals of all of the position indicators. Thus, in accordance with a further feature of the invention, the other rotational speed sensor is located in a commutation unit of the motor, and a first rotational speed signal is formed by an incremental generator and another rotational speed signal is formed by the sensor in the commutation unit of the motor. Moreover, in accordance with an additional feature of the invention, the commutation unit of the motor is provided with a plurality of sensors for detecting angular positions of a rotor, and means for combining signals of the sensors to form one signal for determining the rotational speed.

In accordance with an added feature of the invention, the incremental generator comprises a bar code arranged at the circumferential surface of a rotor of the motor, and an optoelectronic sensor for scanning the bar code. The optoelectronic sensor can be in the form of a reflex light key or a one-way light barrier. By means of such a sensor the rotational speed can be detected with great accuracy and high resolution in a low speed range.

In accordance with a concomitant feature of the invention, for the purpose of controlling the motor, the rotational speed determined by the sensors is fed to a comparator unit which compares the actual value with a reference value, the reference rotational speed value being provided in the form of either a defined or predetermined value or a variable value. To control the rotational speed of the motor, a differential signal generated by the comparator unit is applied within the entire speed range. In this regard, there are provided, in accordance with the invention, means for feeding the rotational speed signals to a rotational speed control unit comprising a comparator unit for generating a differential signal by comparing the rotational speed signal with a reference rotational speed value, and including means for feeding the differential signal to a subordinated current control loop for correcting the rotational speed of the motor.

Other features which are considered as characteristic for the invention are set forth in the appended claims.

Although the invention is illustrated and described herein as embodied in a device for detecting rotational speed of a motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
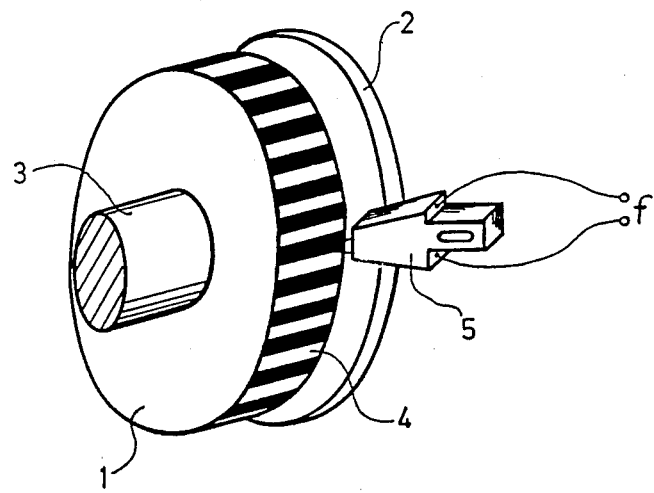
FIG. 1 is a perspective view of a direct-current motor having a tachometer track.

Referring now to the drawing and first, particularly, to FIG. 1 thereof, there is shown a motor having a tachometer track 4 disposed on the outer periphery of a rotor 1 thereof. The motor is a bell-type armature motor, and the rotor 1 has a drive shaft 3 attached thereto. The motor is secured by a flange 2 at the stator-side thereof. At the periphery or circumference of the rotor 1, the tachometer track 4 provided thereat has bright and dark fields. The tract 4 is scanned by a reflex light key 5, thus generating a speed-dependent frequency signal. The tachometer track 4 is formed, for example, of an aluminum foil which has been produced by screen printing and has been adhesively secured to the circumferential surface of the rotor 1. The reflex light key 5 functions in the infrared range so that interference caused by external light is avoided. Thus, the output signal of the reflex light key 5 is a frequency which is proportional to the rotational speed and has a very high resolution. In the case of higher rotational speeds, a reflex light key is subject to a risk that its maximum switching frequency will be exceeded with the effect that its output signal will no longer be appropriate for determining the rotational speed. In order to permit rotational speed control also in the case of high motor speeds, signals of one or more commutation sensors which serve for commutating the motor are evaluated, starting from a defined threshold value, for determining the rotational speed.

Figure 2:
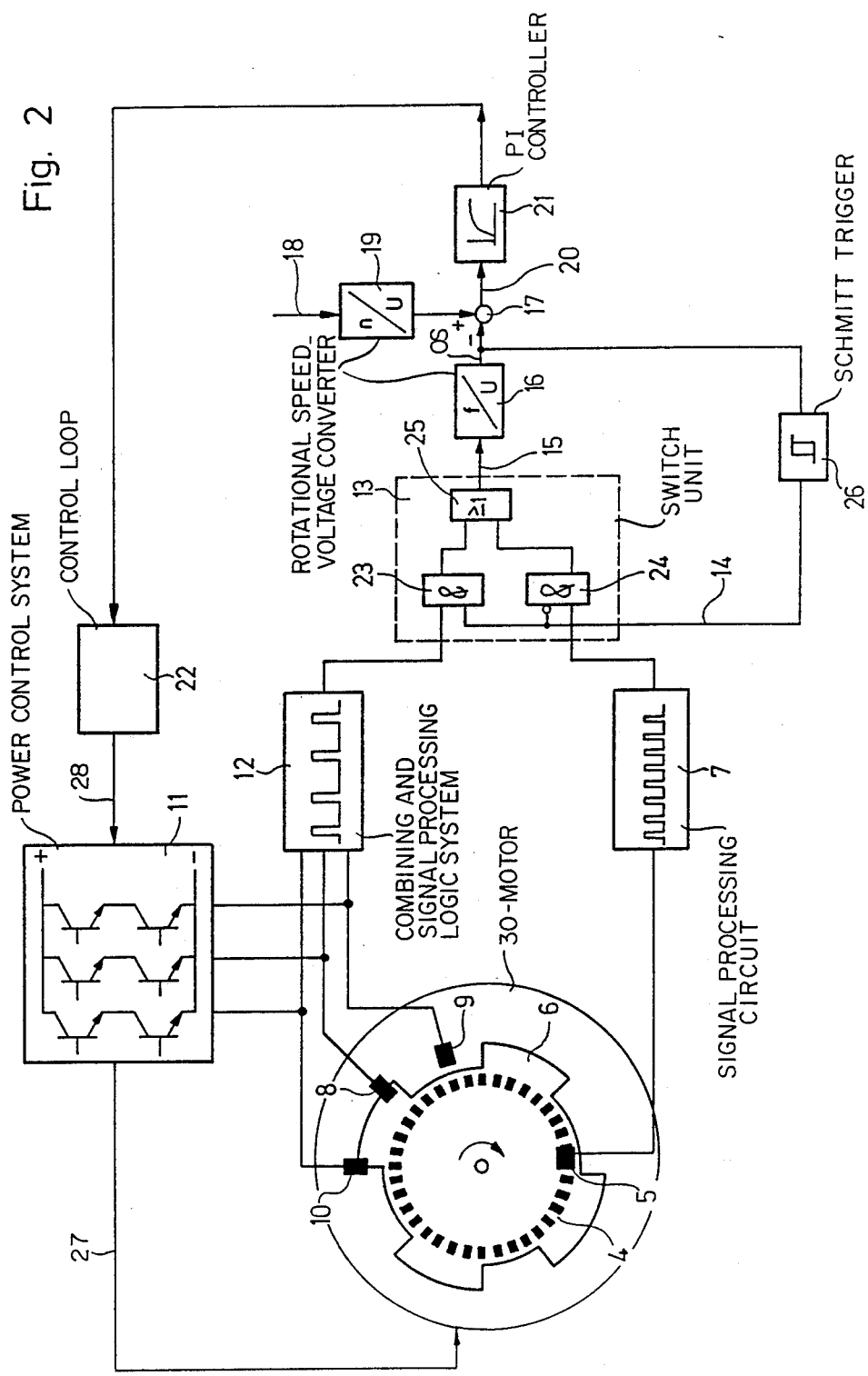
FIG. 2 is a circuit diagram for controlling the rotational speed of the d-c motor of FIG. 1.

FIG. 2 shows a circuit which permits reliable detection of the rotational speed over the entire speed range of the motor. In this embodiment, the tachometer track 4 is provided on a signal generator disk 6 disposed on the rotor 1 of a brushless DC-motor 30, and is scanned by the reflex light key 5. The signal of the reflex light key 5 is fed to a signal processing circuit 7, e.g. to a Schmitt trigger circuit.

Sensors 8, 9 and 10 e.g. Hall-effect sensors, are used as position indicators by brushless DC motors for the control of the electronic commutation. The sensors 8, 9 and 10 are arranged within the range of the signal generator disk or commutation diaphragm 6 so that, by combining the signals thereof, information as to the angular position of the rotor is generated. In a conventional manner, these signals are fed to a power control system 11 which controls the currents of the non-illustrated windings of the motor. In this embodiment, the signals of the sensor or position indicators 8, 9 and 10 are also fed to a combining and signal processing logic system 12 which generates a speed-dependent frequency signal from these three signals. The combining and signal processing logic system 12 and the signal processing circuit 7 have respective output signals which are fed to a switch unit 13 which, in accordance with the respective rotational speed range of the motor, has the task of switching one of the two fed signals through to a following circuit. The switch unit 13 is formed, for example, of two AND elements 23 and 24 having respective inputs to each of which a rotational speed signal is fed from the signal processing logic system 12 and the signal processing circuit 7, respectively. The AND elements 23 and 24 have outputs which are connected to one-another via an OR circuit 25. Further inputs of the AND elements are activated by a control signal; the control signal is supplied to the AND element 23 directly and to the AND element 24 in an inverted form through the intermediary of a Schmitt trigger 26, the control signal being formed, for example, of a speed-dependent voltage signal. Of course, there are numerous possibilities for switching over the rotational speed signals. Thus, the invention is not limited to the use of the illustrated logic units.

The rotational speed signal 15, present at the output of the switch unit 13, is fed to a rotational speed voltage converter or transformer 16 which generates a speed-proportional voltage signal. The latter voltage signal is compared by a comparator unit at the node 17 with a reference rotational speed signal from a suitable converter or transformer 19, forming a differential signal 20. The differential signal 20 is fed via a PI controller 21 and an output signal thereof as a reference current value to a subordinated current control loop 22 which generates a control signal for a power control system 11.

Various components of FIG. 2 are described hereinafter in greater detail.

Figure 3:
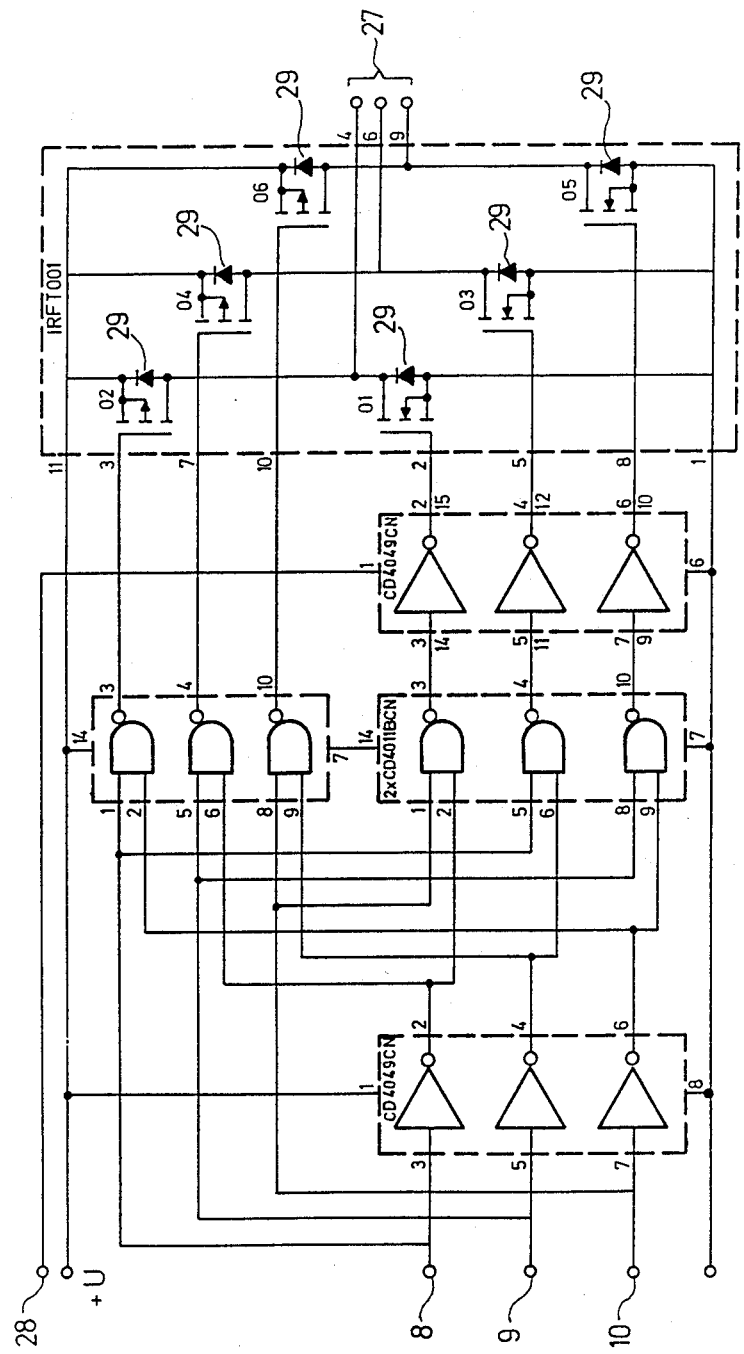
FIG. 3 is a schematic circuit diagram of a power control for driving a brushless DC-motor as shown in FIG. 2.

The circuit for the power control system 11 for the brushless DC-motor 30, is shown in FIG. 3. It has three power inputs 8, 9 and 10 from the signal generator disk 6. The power inputs are each connected to an inverter (CD4049CN), each having an output connected to one input of two out of six AND-gates (CD4011BCN), which in turn control three pairs of power transistors or thyristors 29, each pair providing power for each of the three outputs 4, 6, and 9 of connection 27, which in turn drive the shaft 3 of the motor 30, on which the disk 6 is mounted. The circuit receives positive power from lead U+, and the inverters driving the power transistors 29 are powered via lead 28.

Figure 4:
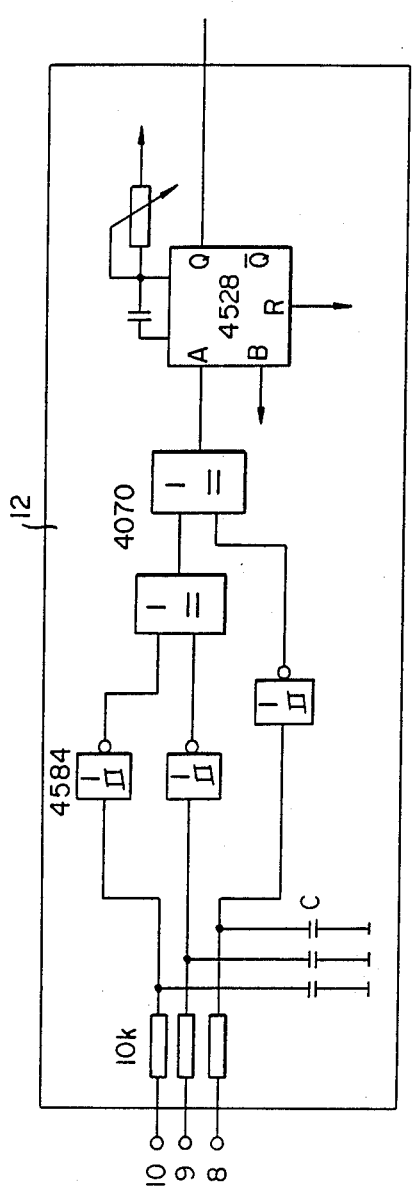
FIG. 4 is a schematic circuit diagram of a combining and signal processing logic system as shown in FIG. 2.

The combining and signal processing logic system 12 of FIG. 2 is shown in greater detail in FIG. 4 and includes three inputs 8, 9, 10 from the disk 6, each having an input resistor, followed by a capacitor connected to ground, and three inverting Schmitt triggers (4584). The first two inverting Schmitt triggers are connected to the inputs of a first exclusive OR-gate (4070), the output of which is connected to one input of a second exclusive OR-gate, having its other input connected to the output of the third inverting Schmitt trigger, and is, in turn, connected by its output to the input of a monostable multivibrator (4528). The multivibrator has a capacitor and a variable potentiometer as timing elements.

Figure 5:
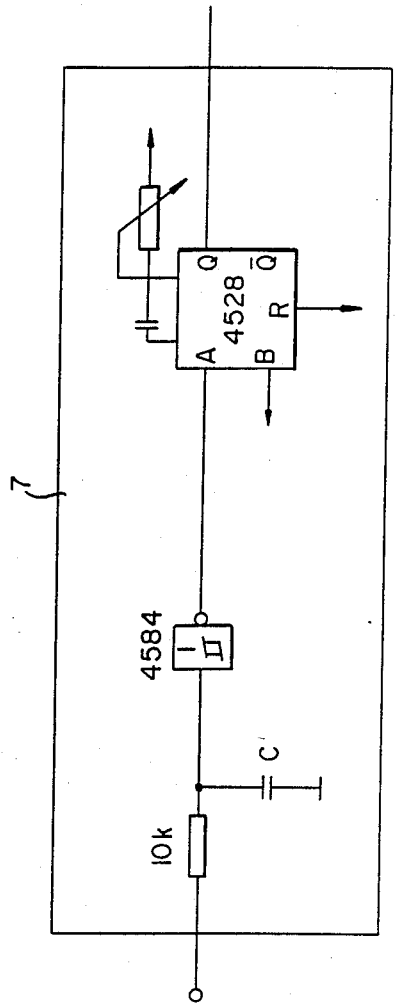
FIG. 5 shows further details of the logic system of FIG. 4.

The signal processing circuit 7 of FIG. 2, shown in greater detail in FIG. 5, has an input connected to an input resistor followed by a ground-connected capacitor, followed by an inverting Schmitt trigger (4584). The Schmitt trigger (4584) is connected by its output to the input of a monostable multivibrator (4528), having a capacitor and a variable potentiometer as timing elements.

The switch unit 13, shown in FIG. 2, is an electronic switching circuit having two, two-input AND-gates 23 and 24, of which each one has an input connected to the output of the signal processing circuit 7 and the combining and signal processing logic system 12, respectively. The AND-gate 23 has one input connected to an inverting input of the AND-gate 24, which, in turn, is connected to the output of the Schmitt trigger 26.

The outputs of the two AND-gates 23 and 24 are connected to respective inputs of an OR-gate 25 which, in turn, drives the rotational speed-voltage converter or transformer 16, in response to the logic level of the output of the Schmitt trigger 26 with the output signal from either one of the signal processing circuit 7 or the combining and signal processing logic system 12.

Figure 6:
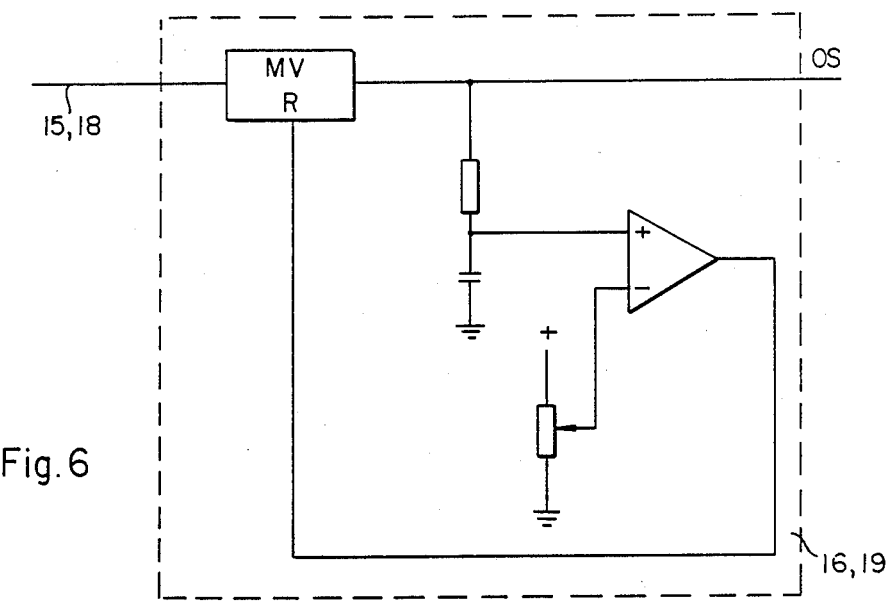
FIG. 6 is a schematic circuit diagram of a rotational speed-voltage converter or transformer as shown in FIG. 2.

The rotational speed-to-voltage transformer or converter 16, as shown in FIG. 2, receives its input from the output 15 of the switch unit 13. As shown in greater detail in FIG. 6, the transformer or converter 16 converts the frequency of the input signal, by means of a monostable multivibrator MV, to a pulsed output signal OS that has an averaged value that is proportional to the input frequency. The pulsed output signal OS is integrated, i.e. "averaged", in an integrating circuit formed of an input resistor connected to a ground-connected capacitor and to a non-inverting input of an operational amplifier, having its inverting input connected to the output of a potentiometer, thus operating as a comparator for comparing the output of the integrating circuit with the potentiometer input. The comparator output is connected back to a reset pin R of the monostable vibrator MV resulting in an output signal from the monostable multivibrator MV that is proportional to the input frequency of the signal 15 from the switch unit 13.

The converter or transformer 19 is identical with the rotational speed voltage converter or transformer 16, and performs the same function, except that its input is the motor RPM n instead of the motor frequency f.

Figure 7:
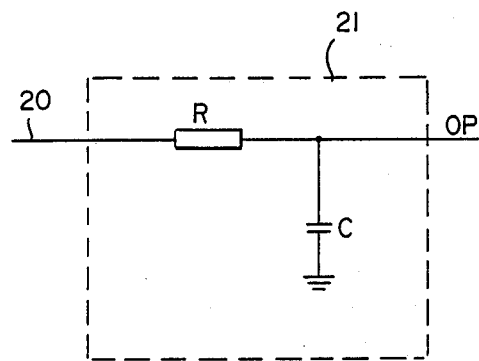
FIG. 7 is a circuit diagram of a simple low-pass filter like that shown in FIG. 2.

The PI controller 21 of FIG. 2 is a low-pass filter construction, as shown in greater detail in FIG. 7, which serves to pass frequencies lower than the frequency of the stop-band of the filter. In effect, the low-pass filter 21 serves to smooth out the signal 20 from the comparator unit 17, which has a certain amount of "ripple" therein, which creates a high-frequency signal that is undesirable at the input of the current control loop 22. The low-pass filter 21, in its most basic form is a resistor-capacitor network, as shown in FIG. 7, having an input 20 and an output OP.

The motor speed or current control loop 22 of FIG. 2 is of the type particularly suited for a brushless DC-motor. The motor RPM is advantageously controlled by means of a thyristor-controlled current feed circuit, connected to the motor armature. In an especially advantageous embodiment, the speed control circuit employs the principle of current leading speed control, which overcomes the problem encountered with a high ripple-content is present in the armature current. Circuits of this type are well known and widely used, and are described, for example, in the proceedings of the Second IFAC Symposium Düusseldorf, Federal Republic of Germany, October 3 to 5, 1977, by W. Leonhard, and published by Pergamon Press, New York, N.Y., wherein reference especially should be had to page 586 and FIG. 2. U.S. Pat No. 4,633,151 also provides a description of a motor control loop for a brushless DC-motor of a type that would be suitable for the control circuit 22.

The conventional Schmitt trigger 26 is, for example, of the type 4584, which inserts a certain amount of hysteresis in the feedback signal 14 in order to eliminate minor noise and ripple.

We claim:

1. Device for detecting the rotational speed of a brush-free dc-motor having a commutating device, comprising a first and at least a second rotational speed sensor for generating respective first and second rotational speed signals, an incremental generator engaging the first speed sensor, the commutating device engaging the second sensor, a logical switching unit connected to said first and second sensors for selecting one of the incremental generator and the commutating device within a respective given rotational speed range, and wherein said incremental generator and commutating device are fixedly connected to the motor shaft.

2. Device according to claim 1, wherein the incremental generator has a relatively high resolution, and wherein said commutating device has a relatively low resolution.

3. Device according to claim 1, wherein said second rotational speed sensor is located in a commutation unit of the motor, and the first rotational speed signal is formed by the incremental generator and the second rotational speed signal is formed by said second sensor in the commutation unit of the motor.

4. Device according to claim 3, wherein the commutation unit of the motor is provided with a plurality of second sensors for detecting angular positions of a rotor, and means for combining the signals of said first and second sensors to form one signal for determining the rotational speed.

5. Device according to claim 3, wherein said incremental generator comprises a bar code arranged at the circumferential surface of a rotor of the motor, and an optoelectronic sensor for scanning said bar code.

6. Device according to claim 3, including means for feeding the first and second rotational speed signals to a rotational speed control unit comprising a comparator unit for generating a differential signal by comparing the rotational speed signal with a reference rotational speed value, and including means for feeding said differential signal to a subordinated current control loop for correcting the rotational speed of the motor.

* * * * *